(12) United States Patent
Nieuwoudt et al.

(10) Patent No.: US 8,298,412 B2
(45) Date of Patent: Oct. 30, 2012

(54) STRUCTURED PACKING MODULE FOR MASS TRANSFER COLUMN AND PROCESS INVOLVING SAME

(75) Inventors: Izak Nieuwoudt, Wichita, KS (US); Michael James Lockett, Grand Island, NY (US)

(73) Assignee: Koch-Glitsch, LP, Wichita, KS (US)

( * ) Notice: Subject to any disclaimer, the term of this patent is extended or adjusted under 35 U.S.C. 154(b) by 425 days.

(21) Appl. No.: 12/560,837

(22) Filed: Sep. 16, 2009

(65) Prior Publication Data

US 2010/0065501 A1 Mar. 18, 2010

Related U.S. Application Data

(60) Provisional application No. 61/097,758, filed on Sep. 17, 2008.

(51) Int. Cl.
*B01D 3/32* (2006.01)

(52) U.S. Cl. .......... 210/175; 62/643; 165/164; 165/166; 202/158; 202/239; 210/511; 261/95; 261/112.2

(58) Field of Classification Search .......... 62/643, 62/903; 165/164, 166, 172, 173, 175, 176; 202/158, 239; 210/175, 184, 511, 522, 634, 210/774; 261/95, 97, 100, 112.2
See application file for complete search history.

(56) References Cited

U.S. PATENT DOCUMENTS

| | | | |
|---|---|---|---|
| 2,793,017 A | 5/1957 | Lake | |
| 3,466,019 A * | 9/1969 | Priestley | 261/112.2 |
| 3,540,702 A * | 11/1970 | Uyama | 261/112.2 |
| 3,568,461 A * | 3/1971 | Hoffman | 202/158 |
| 3,599,943 A | 8/1971 | Munters | |
| 3,733,063 A | 5/1973 | Loetel et al. | |
| 3,823,925 A * | 7/1974 | Balan | 261/98 |
| 3,963,810 A | 6/1976 | Holmberg et al. | |
| 3,965,225 A | 6/1976 | Schinner | |
| 4,183,403 A * | 1/1980 | Nicholson | 165/166 |
| 4,597,916 A | 7/1986 | Chen | |
| 4,668,443 A | 5/1987 | Rye | |
| 4,676,934 A | 6/1987 | Seah | |

(Continued)

FOREIGN PATENT DOCUMENTS

EP 0858366 B1 7/2000

OTHER PUBLICATIONS

"Intalox Packed Tower Systems Severe Services". Koch-Glitsch, LP. Jul. 26, 2008 <www.koch-glitsch.com/koch/product-brochures/KGSS.pdf>.

(Continued)

*Primary Examiner* — Joseph Drodge
(74) *Attorney, Agent, or Firm* — Hovey Williams LLP

(57) ABSTRACT

A cross-corrugated structure packing module is provided for use in mass transfer or heat exchange columns and has particular applicability in severe service applications in which fouling, coking, and erosion are of concern. The structured packing module has a plurality of upright, parallel-extending, corrugated plates. Spacer elements are used to maintain the corrugations of adjacent plates in spaced apart relationship to reduce the opportunity for solids to accumulate on the surfaces of the plates. The plates are also free of apertures or surface treatments that would increase the opportunity for solids to accumulate on the plates.

15 Claims, 3 Drawing Sheets

U.S. PATENT DOCUMENTS

| | | | |
|---|---|---|---|
| 4,732,713 A | 3/1988 | Korsell | |
| 5,063,000 A | 11/1991 | Mix | |
| 5,124,087 A | 6/1992 | Bradley et al. | |
| 5,217,788 A | 6/1993 | Rye | |
| 5,316,628 A * | 5/1994 | Collin et al. | 203/72 |
| 5,413,741 A | 5/1995 | Buchholz et al. | |
| 5,523,062 A | 6/1996 | Hearn et al. | |
| 5,624,733 A | 4/1997 | McKeigue et al. | |
| 5,700,403 A | 12/1997 | Billingham et al. | |
| 5,722,258 A * | 3/1998 | Aitken | 62/643 |
| 5,724,834 A | 3/1998 | Srinivasan et al. | |
| 5,975,503 A | 11/1999 | Chuang et al. | |
| 6,000,685 A | 12/1999 | Groten et al. | |
| 6,101,841 A | 8/2000 | Billingham et al. | |
| 6,206,350 B1 | 3/2001 | Harrison et al. | |
| 6,280,819 B1 | 8/2001 | McKeigue et al. | |
| 6,286,818 B1 | 9/2001 | Buhlmann | |
| 6,293,528 B1 | 9/2001 | Monkelbaan et al. | |
| 6,325,360 B1 | 12/2001 | Rajan et al. | |
| 6,378,332 B1 | 4/2002 | Billingham et al. | |
| 6,517,058 B1 * | 2/2003 | Engh et al. | 261/112.1 |
| 6,598,861 B2 | 7/2003 | Sunder et al. | |
| 6,857,469 B2 * | 2/2005 | Meller et al. | 165/175 |
| 2005/0189663 A1 | 9/2005 | Dollie et al. | |
| 2007/0194471 A1 * | 8/2007 | Nagaoka | 261/100 |

OTHER PUBLICATIONS

Kister, Henry Z.. "Distillation Design". 441-452; 461-469.
International Search Report and Written Opinion dated Apr. 19, 2010, in International Patent Application No. PCT/US2009/057234; International Filing Date: Sep. 17, 2009; Applicant: Koch-Glitsch, LP.

* cited by examiner

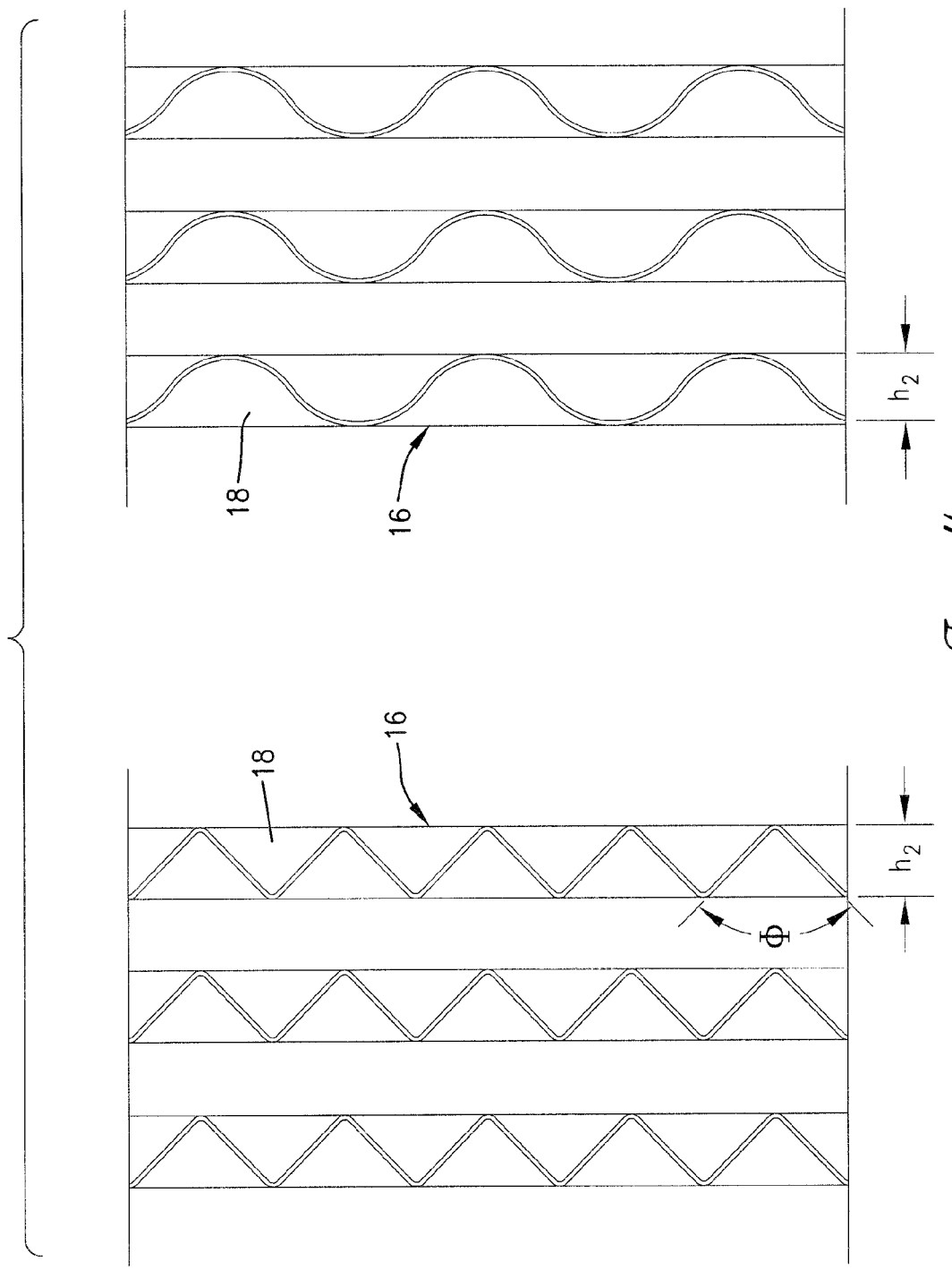

STRUCTURED PACKING MODULE FOR MASS TRANSFER COLUMN AND PROCESS INVOLVING SAME

RELATED APPLICATION

This non-provisional patent application claims priority benefit, with regard to all common subject matter, of earlier-filed U.S. Provisional Patent Application No. 61/097,758, filed Sep. 17, 2008, and entitled "STRUCTURED PACKING MODULE FOR MASS TRANSFER COLUMN AND PROCESS INVOLVING SAME." The identified earlier-filed provisional application is hereby incorporated by reference in its entirety into the present application.

BACKGROUND OF THE INVENTION

The present invention relates generally to an apparatus and a method for facilitating vapor-liquid or liquid-liquid contact in columns in which mass transfer and/or heat exchange processes occur. More specifically, the present invention relates to structured packing modules for use in mass transfer or heat exchange columns and methods of using such modules in severe service applications in which fouling, coking, and erosion are of concern.

Many types of random and structured packing elements have been developed for use in mass transfer or heat exchange columns to facilitate contact between fluid streams flowing within the column. The packing elements generally improve the mass transfer or heat exchange by providing surfaces onto which the fluid streams are able to spread to increase the area of contact between the ascending and descending fluid streams.

Packing elements are frequently used in severe service applications where fouling, coking, and erosion of the packing elements is a problem. Ideally, packing elements used in such severe service applications must have sufficient structural strength to withstand erosion and dramatic column upsets such as steam explosions. The packing elements must also provide a structural geometry that allows the desired separation efficiency to be achieved. At the same time, the packing elements must present enough open area and otherwise be configured in a manner to avoid fouling and coking due to deposition of solid particles on the surface of the packing elements. Many types of conventional packings possess the necessary strength and efficiency characteristics, but are prone to fouling and coking in these severe service applications. Similarly, other types of conventional packings are resistant to fouling and coking but do not provide the desired strength or separation efficiency. A need has thus developed for a structured packing module that provides the desired structural strength and separation efficiency while at the same time being resistant to fouling and coking.

SUMMARY OF THE INVENTION

In one embodiment, the present invention is directed to a structured packing module comprising a plurality of upright, parallel-extending, corrugated plates arranged with the corrugations of adjacent plates extending in a crisscrossing fashion. Spacer elements are used to secure the plates in spaced-apart relationship with the corrugations of adjacent plates spaced from each other along their entire length so that the corrugations are free from contact with other corrugations. The spacing between the corrugations of adjacent plates is completely open to the flow of fluids, typically an ascending vapor, and the surfaces of the plates likewise provide unimpeded flow surfaces for a fluid, typically a descending liquid. In this manner, the plates resist fouling and coking yet are able to provide the desired strength and separation efficiency.

In other embodiments, the invention is directed to a column containing the structured packing module and a process in which the structured packing module is used for facilitating mass transfer and/or heat exchange between fluid streams flowing in the column. In the process, the flow of fluid streams is substantially uniform along the flow paths formed by the corrugations in the plates because of the absence of low flow zones that would be caused by the corrugations of adjacent plates being in contact with each other or other structural elements. The process resists fouling and coking because of the absence of these types of low flow zones. The process can thus be performed under severe service conditions where fouling, coking, and erosion of the plates would normally be a problem.

BRIEF DESCRIPTION OF THE DRAWINGS

FIG. 4 is a fragmentary top plan view showing two embodiments of the corrugated plates which can be used in the structured packing modules.

DETAILED DESCRIPTION

Figure 1:
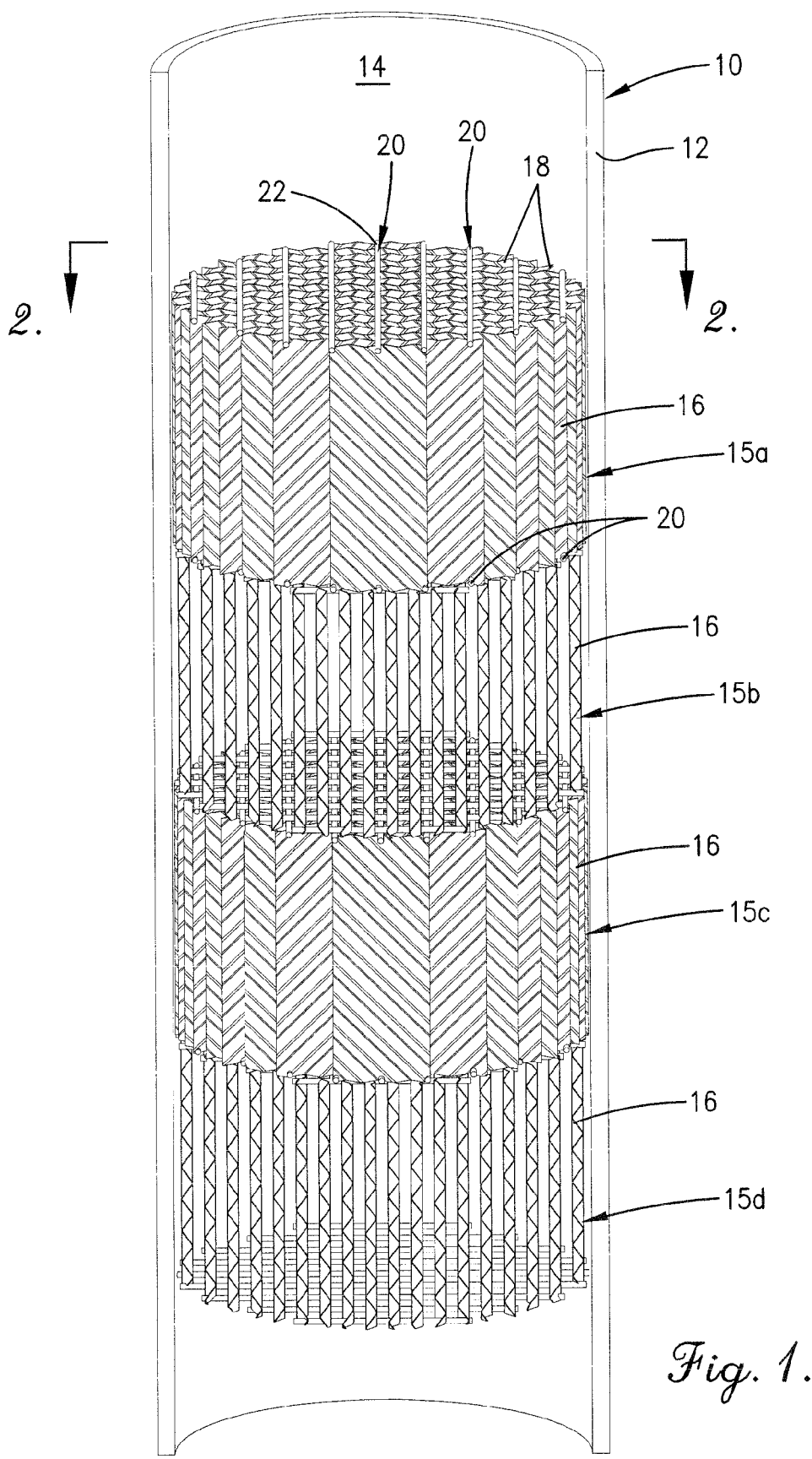
FIG. 1 is a fragmentary elevation view of a column with the column shell taken in vertical section to show structured packing modules of the present invention positioned within the column.

Turning now to the drawings in greater detail and initially to FIG. 1, a column suitable for use in mass transfer and heat exchange processes is represented generally by the numeral 10. Column 10 includes an upright, external shell 12 that is generally cylindrical in configuration, although other configurations, including polygonal, are possible and are within the scope of the present invention. Shell 12 is of any suitable diameter and height and is constructed from one or more rigid materials that are desirably inert to, or are otherwise compatible with the fluids and conditions present during operation of the column 10.

Column 10 is of a type used for processing fluid streams, typically liquid and vapor streams, to obtain fractionation products and/or to otherwise cause mass transfer and/or heat exchange between the fluid streams. For example, column 10 can be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, and other severe service processes occur.

The shell 12 of the column 10 defines an open internal region 14 in which the desired mass transfer and/or heat exchange between the fluid streams occurs. Normally, the fluid streams comprise one or more ascending vapor streams and one or more descending liquid streams. Alternatively, the fluid streams may comprise both ascending and descending liquid streams or an ascending gas stream and a descending liquid stream.

The fluid streams are directed to the column 10 through any number of feed lines (not shown) positioned at appropriate locations along the height of the column 10. One or more vapor streams can also be generated within the column 10 rather than being introduced into the column 10 through the feed lines. The column 10 will also typically include an overhead line (not shown) for removing a vapor product or byproduct and a bottom stream takeoff line (not shown) for removing a liquid product or byproduct from the column 10. Other column components that are typically present, such as reflux stream lines, reboilers, condensers, vapor horns, liquid distributors, and the like, are not illustrated in the drawings because they are conventional in nature and an illustration of these components is not believed to be necessary for an understanding of the present invention.

Figure 2:
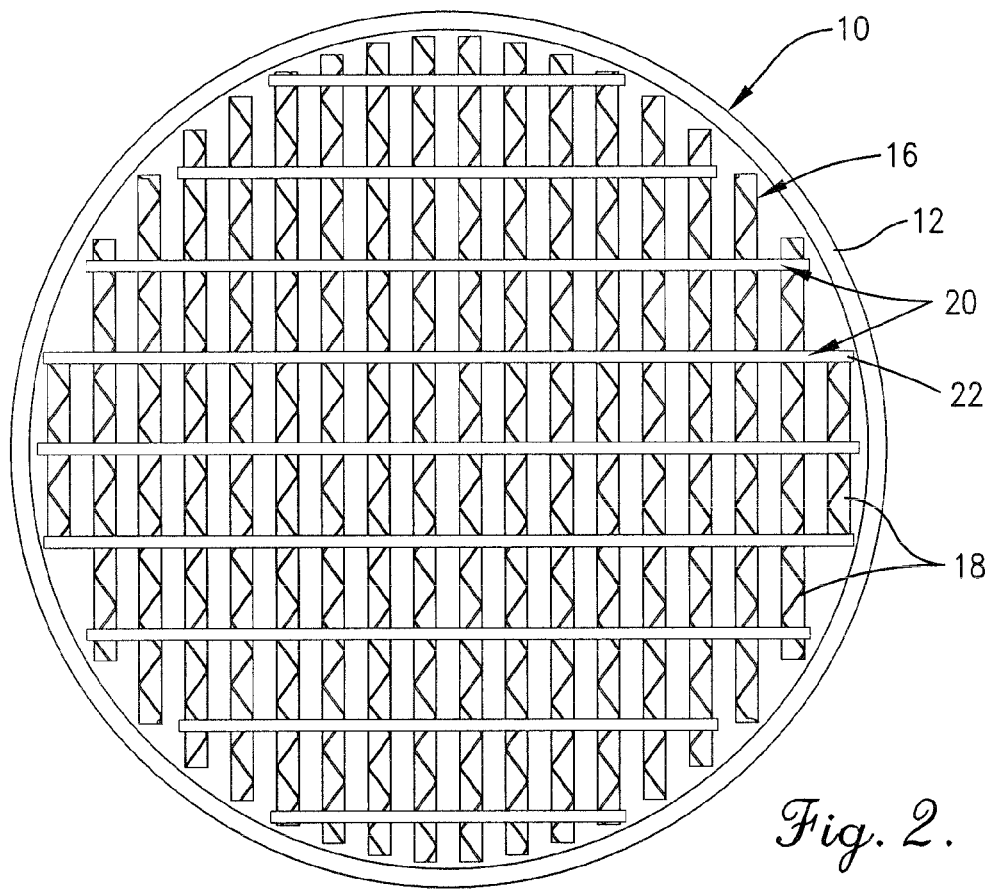
FIG. 2 is a top plan view of the column taken along line 2-2 of FIG. 1 in the direction of the arrows.
Figure 3:
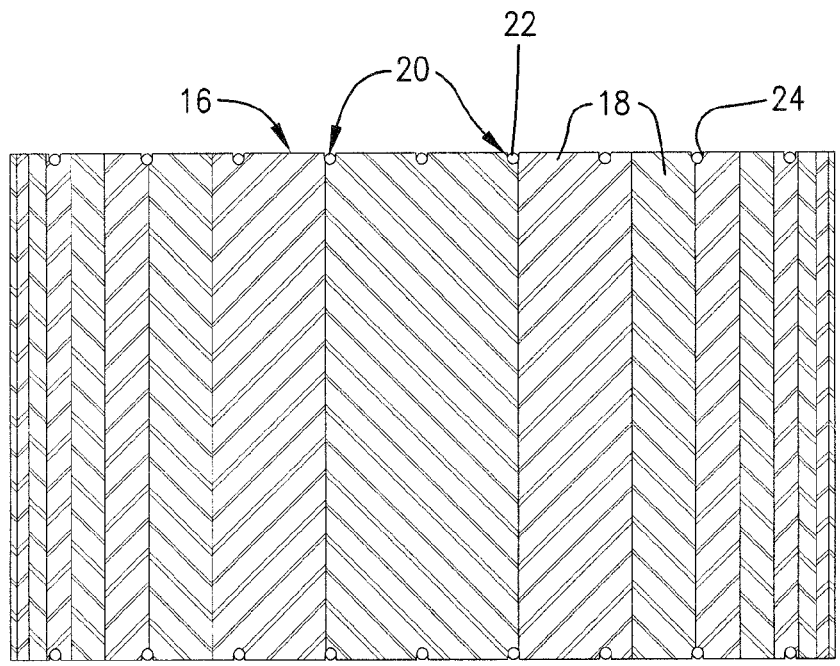
FIG. 3 is a side elevation view of one of the structured packing modules.

In accordance with the present invention, one or more layers 15*a-d* of structured packing modules 16 are positioned within the open internal region 14 of the column 10. Turning additionally to FIGS. 2-4, each structured packing module 16 comprises a plurality of upright, parallel-extending, corrugated plates 18 constructed from a suitably rigid material, such as any of various metals, plastics, or ceramics, having sufficient strength and thickness to withstand erosion and other conditions experienced within the column 10.

As can best be seen in FIG. 4, the corrugations extend along the entire surface of the plates 18 and are generally of a triangular or sinusoidal cross section. The corrugations in adjacent plates 18 of each structured packing module 16 extend in a criss-crossing or cross-corrugated fashion. The angle of inclination of the corrugations in relation to the vertical axis of the column 10 can be selected for the requirements of particular applications. For example, inclination angles of 30, 45, and 60 degrees, as well as other angles, may be used.

If the corrugations of adjacent plates 18 within each structured packing module 16 were allowed to contact each other, the points of contact would provide low flow regions where solids are more likely to accumulate and cause fouling or coking. Thus, the corrugations of adjacent plates 18 within each structured packing module 16 are maintained in spaced apart relationship along their entire length by spacer elements 20 which are joined to the plates 18. The spacer elements 20 are designed to maintain separation between the adjacent plates 18 along their entire length and width to provide unimpeded flow paths for a fluid, typically a liquid, descending along all of the surfaces of the plates and a fluid, typically a vapor, ascending in the open spacing between the plates 18. The corrugations of adjacent plates 18 form inclined flow channels for this descending vapor. Because the corrugations of adjacent plates 18 do not contact each other or other structures, the flow of the liquid and vapor along the plates 18 is generally uniform without the presence of low flow regions that could cause the accumulation of solids on the plates 18 and resulting coking or fouling of the plates 18.

The spacer elements 20 may take any of various suitable forms. In the illustrated embodiment, the spacer elements 20 are a series of smooth rods 22 that extend along the top and bottom edges of the structured packing modules 16 in a generally perpendicular direction to the plates 18. The rods 22 are secured to the plates 18 by welding or other means. The rods 22 may extend through or may be recessed within apertures 24 formed in the edges of the plates 18 so that they do not impede contact between the top edges of plates 18 in one structured packing module 16 and the bottom edges of plates 18 in an overlying structured packing module 18. The rods 22 can have a round, triangular, square or other desired cross section. The apertures 24 receiving the rods 22 can be formed as notches or complete holes and likewise can have a round, triangular, square or other desired shape. The spacer elements 20 function to secure together the plates 18 within each structured packing module 16 and to maintain the desired spacing between the corrugations of the adjacent plates 18. It is to be understood that other types of spacing elements 20 besides rods 22 may be used to perform these functions. This is contemplated by and within the scope of the present invention. Desirably, however, the spacer elements 20 are constructed and attached to the plates 18 in a manner to reduce the opportunity for solids to accumulate on the spacer elements 20 or at their points of attachment to the plates 18.

The crimp angle $\Phi$ (FIG. 4) and the height $h_2$ (FIG. 4) or amplitude of the corrugations in each plate 18, as well as the spacing between adjacent plates 18 within each structured packing module 16, can be varied for particular applications. As the crimp height of the corrugations increases, the number of plates 18 that may be positioned within the cross section of the column 10 decreases. Likewise, as the spacing between the plates 18 increases, the number of plates 18 that may be positioned across the cross-sectional area of the column 10 decreases. In general, as the number, or surface area, of the plates 18 increases, the efficiency of the mass transfer or heat exchange process likewise increases. At the same time, however, the pressure drop between the top and bottom edges of the structured packing modules 16 increases and the fluid flow capacity of the structured packing modules 16 decreases.

The likelihood that solids will accumulate on the surfaces of the plates 18 also increases as the bending radius of the corrugation peaks decreases. Thus, in severe service applications where fouling and coking are of concern, it is generally desirable to reduce the bending radius of the plates 18 to reduce the opportunity for solids to accumulate on the plates 18, while at the same time selecting the crimp angle and height of the corrugations and the spacing between adjacent plates 18 to provide the desired pressure drop and fluid flow capacity for the structured packing module 16.

Each layer 15*a-d* of structured packing modules 16 may consist of a single structured packing module 16 that extends completely across the cross section of the column 10 and is supported on a support ring (not shown) fixed to the column shell 12, an underlying packing module 16, or another suitable support structure. Alternatively, a plurality of individual structured packing modules 16 in a brick-like form may be assemble to form one or more of the layers 15*a-d*. Each structured packing modules 16 is normally stacked directly on the adjacent underlying structured packing module 16 and is typically rotated so that the corrugated plates 18 in one layer are positioned in vertical planes that are angled with respect to the vertical planes defined by the corrugated plates 18 in adjacent layers. This angle of rotation is typically 45 or 90 degrees, but can be other angles if desired.

The entire surfaces of the plates 18 are generally smooth and free of surface texturing and apertures (other than the apertures 24 used to secure the rods 22 to the plates 18) that may allow solids to accumulate on the plates 18. Spray nozzles (not shown) may be positioned above and/or below the modules 16 to direct a spray wash onto the surfaces of the plates 18 to dislodge or prevent the accumulation of solids on the plates 18. In order to allow the spray wash to reach all surfaces of the plates 18, the modules 16 may be constructed with a vertical height of as little as approximately 2 and $7/8^{th}$ inches. In other applications, the structured packing modules 16 may have a height of up to or greater than approximately 6 inches. In applications where solids in the fluid feed streams would cause plugging of the spray nozzles or conventional trough-type fluid distributors that feed the fluid to the modules 16, a weir trough-type liquid distributor may be used.

In use, one or more of the structured packing modules 16 are positioned within the open internal region 14 within the column 10 for use in facilitating mass transfer and/or heat exchange between fluid streams flowing countercurrently within the column 10. As the fluid streams encounter the plates 18 in the one or more structured packing modules 16, the fluid streams spread over the surfaces of the plates 18 to increase the area of contact and, thus, the mass transfer and/or heat exchange between the fluid streams. Because the corrugations of adjacent plates 18 are spaced apart from each other, a fluid stream, typically a liquid stream, is able to descend along the inclined surface of the corrugations in a generally uniform manner without being impeded by low flow zones that typically occur when the corrugations are in contact with each other or other structural elements along their length. Another fluid stream, typically a vapor stream, is likewise able to ascend in the open spacing between the plates 18 in a substantially uniform manner without being impeded by areas of low flow that would result if the corrugations were in contact with each other or other structural elements along their length. In this manner, the structured packing modules 16 provide the desired structural strength and separation efficiency while being resistant to fouling and coking.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A structured packing module comprising:
   a plurality of upright, parallel-extending, plates having a top and a bottom edge and corrugations, the plates being arranged with the corrugations of adjacent plates extending in a criss-crossing fashion;
   apertures at said top and bottom edges of the plates; and
   spacer elements comprising rods that extend through said apertures at said top and bottom edges of the plates to secure the plates in spaced-apart relationship with the corrugations of adjacent plates spaced from and not in contact with each other or other structures along substantially an entire length of the corrugations to form an open spacing between facing surfaces of the plates,
   wherein said surfaces of the plates and said open spacing between the plates form generally unimpeded flow paths for fluids, and
   wherein said surfaces of the plates are free of apertures except at said top and bottom edges.

2. The structured packing module of claim 1, wherein the corrugations extend along an entire surface of each plate.

3. The structured packing module of claim 1, wherein the surfaces of the plates are smooth and generally free of texturing.

4. The structured packing module of claim 1, wherein said rods are smooth and of round cross section.

5. The structured packing module of claim 1, wherein said rods are welded to said plates.

6. The structured packing module of claim 1, wherein said plates are constructed of metal.

7. The structured packing module of claim 6, wherein the plates have a top and a bottom edge and said spacer elements comprise rods that extend through the plates at said top and bottom edges in a direction generally perpendicular to the plates.

8. The structured packing module of claim 7, wherein said surfaces of the plates are smooth, generally free of texturing, and free of apertures except for those apertures through which the rods extend at said top and bottom edges.

9. The structured packing module of claim 8, having a vertical height of approximately 2 and 7/8th inches.

10. The structured packing module of claim 8, having a vertical height of up to approximately 6 inches.

11. The structured packing module of claim 8, wherein said rods are welded to the plates.

12. A mass transfer or heat exchange column comprising:
    a shell defining an open internal region; and
    a structured packing module positioned within said open internal region, said structured packing module comprising:
      a plurality of upright, parallel-extending, plates having a top and a bottom edge and corrugations, the plates being arranged with the corrugations of adjacent plates extending in a criss-crossing fashion;
      apertures at said top and bottom edges of the plates; and
      spacer elements comprising rods that extend through said apertures at said top and bottom edges of the plates to secure the plates in spaced-apart relationship with the corrugations of adjacent plates spaced from and not in contact with each other or other structures along substantially an entire length of the corrugations to form an open spacing between facing surfaces of the plates,
      wherein said surfaces of the plates and said open spacing between the plates form generally unimpeded flow paths for fluids, and
      wherein said surfaces of the plates are free of apertures except at said top and bottom edges.

13. The column of claim 12, wherein the surfaces of the plates are smooth and generally free of texturing.

14. The column of claim 12, wherein said rods are smooth and of round cross section.

15. The column of claim 12, wherein said rods are welded to said plates.

* * * * *